US009143591B2

(12) United States Patent
Liang

(10) Patent No.: US 9,143,591 B2
(45) Date of Patent: Sep. 22, 2015

(54) CLIPPING STRUCTURE AND KEY MODULE

(71) Applicant: GETAC TECHNOLOGY CORPORATION, Hsinchu County (TW)

(72) Inventor: Ting-Wei Liang, Taoyuan County (TW)

(73) Assignee: Getac Technology Corporation, Hsinchu County (TW)

( * ) Notice: Subject to any disclaimer, the term of this patent is extended or adjusted under 35 U.S.C. 154(b) by 0 days.

(21) Appl. No.: 14/170,537

(22) Filed: Jan. 31, 2014

(65) Prior Publication Data
US 2015/0007501 A1   Jan. 8, 2015

(30) Foreign Application Priority Data
Jul. 4, 2013   (CN) .......................... 2013 1 0278101

(51) Int. Cl.
*B65D 39/00* (2006.01)
*B65D 45/16* (2006.01)
*H04M 1/18* (2006.01)
*H04M 1/23* (2006.01)

(52) U.S. Cl.
CPC ................ *H04M 1/185* (2013.01); *H04M 1/18* (2013.01); *H04M 1/236* (2013.01)

(58) Field of Classification Search
CPC ..................... B65D 2543/00555; B65D 39/00; B65D 39/088; Y10T 16/05
USPC ......... 220/233, 243, 245, 247–251, 787–789, 220/359.3, DIG. 19; 174/67; 248/345; 215/294, 299; 24/293, 287
See application file for complete search history.

(56) References Cited

U.S. PATENT DOCUMENTS

| | | | | | |
|---|---|---|---|---|---|
| RE30,326 | E | * | 7/1980 | van Buren, Jr. | 220/326 |
| 4,998,692 | A | * | 3/1991 | Shigeki et al. | 248/56 |
| 5,702,133 | A | * | 12/1997 | Pavur et al. | 292/80 |
| 5,852,854 | A | * | 12/1998 | Pierrot et al. | 24/297 |
| 6,562,477 | B1 | * | 5/2003 | Leon et al. | 428/500 |
| 2008/0142517 | A1 | * | 6/2008 | Nakazato | 220/201 |
| 2014/0085781 | A1 | * | 3/2014 | Zeng | 361/679.01 |

* cited by examiner

Primary Examiner — Shawn M Braden

(57) ABSTRACT

A clipping structure configured to clip a key cap of a key module on a housing having an outer surface and an inner surface oppositely disposed is provided. The clipping structure includes a main part, a sealing part, and at least two latch parts. The main part is connected to the key cap and has a sticking portion. The sealing part is disposed between the sticking portion of the main part and the outer surface of the housing. Each latch part includes an end with a latch buckled to the inner surface of the housing. Each latch part includes another end tightly bonded to the main part. Each latch part is leaned against the inner surface of the housing by each latch, so that the outer surface of the housing is pressed by the sticking portion of the main part. A key module with the clipping structure is also provided.

11 Claims, 8 Drawing Sheets

CLIPPING STRUCTURE AND KEY MODULE

BACKGROUND OF THE INVENTION

1. Field of the Invention

The invention relates to a clipping structure, and more particularly to a clipping structure with waterproof characteristic.

2. Description of Related Art

With the rapid development and innovation in semiconductor technology, hand-held electronic devices having compact and portable characteristics, such as smart phones or tablet computers, have been widely applied in daily life. Demand for multi-functionality is also generated due to different fields in which these hand-held electronic devices are applied to. For example, the basic requirement of those military phones or military computers, is to be able to operate in all weathers. A waterproof characteristic is an important requirement for the military phones or the military computers to operate in bad weathers, so as to ensure that war intelligence is accurately transmitted. In addition to military applications, the hand-held electronic devices for distributing goods in logistics and distribution industry may also require the waterproof characteristic for operating properly in bad weathers.

Furthermore, the smart phones advertised with waterproof and dustproof characteristics start to circulate in the market in recent years. Said smart phones have become the mainstream in the market since they are capable of providing excellent waterproof and dustproof characteristics for wider applicability. Generally, in a structure of the smart phone, moist is most likely to invade the body through gaps between keys to damage inner circuits. As a result, the hand-held electronic devices may be prone to malfunction. Accordingly, how to improve waterproof characteristic at the keys while reducing influence by waterproof structure to appearance of the mobile phone has become an important issue to be solved.

SUMMARY OF THE INVENTION

The invention is directed to a clipping structure capable of fixing a key to a housing, so as to prevent water or foreign bodies from entering.

The invention provides a key module having the clipping structure as mentioned above.

The clipping structure of the invention is configured to clip a key cap of the key module on the housing having an outer surface and an inner surface oppositely disposed. The clipping structure includes a main part, a sealing part, and at least two latch parts. The main part is connected to the key cap and has a sticking portion. The sealing part is disposed between the sticking portion of the main part and the outer surface of the housing. Each latch part includes an end with a latch buckled to the inner surface of the housing. Each latch part includes another end tightly bonded to the main part. Each latch part is leaned against the inner surface of the housing by each latch, so that the outer surface of the housing is pressed by the sticking portion of the main part.

The key module of the invention is configured to be assembled to an opening of the housing having an outer surface and an inner surface oppositely disposed. The key module includes a key cap, a main part, a sealing part and at least two latch parts. The main part is connected to the key cap and configured to trigger a signal. The sealing part is disposed between the main part and the outer surface of the housing, and surrounding the opening to prevent external foreign bodies from entering the opening through a gap between the main part and the outer surface. Each latch part includes an end with a latch buckled to the inner surface of the housing. Each latch part includes another end tightly bonded to the main part. Each latch part is leaned against the inner surface of the housing by each latch, so that the outer surface of the housing is pressed by the main part.

In an embodiment of the invention, a distance from an edge of each latch part leaned against the inner surface to a contact surface of the sealing part contacted with the outer surface is less than or equal to a distance from the outer surface to the inner surface of the housing.

In an embodiment of the invention, the sealing part is an encapsulant having a waterproof characteristic.

In an embodiment of the invention, the sealing part is a sealing ring.

In an embodiment of the invention, a platen is co-constructed with the another end of each of the at least two latch parts tightly bonded to the main part.

In an embodiment of the invention, the main part further covers the platen.

In an embodiment of the invention, a material of the at least two latch parts is a metal, and a material of the main part is a rubber.

In summary, the clipping structure of the invention is capable of fixing the key cap of the key. The main part of the clipping structure may be attached to the outer surface of the housing through the sealing part. The latch of the latch part is capable of being buckled to the inner surface of the housing, and pressing the sticking portion of the main part to the outer surface of the housing, such that attachment between the outer surface and the sealing part may be improved, so as to prevent water and foreign bodies form entering. In the clipping structure of the invention, by utilizing the sealing part and the latch to clip the housing, the waterproof effectiveness of the key may be improved, and spaces required for the structure may also be saved.

To make the above features and advantages of the disclosure more comprehensible, several embodiments accompanied with drawings are described in detail as follows.

DESCRIPTION OF THE EMBODIMENTS

Figure 1:
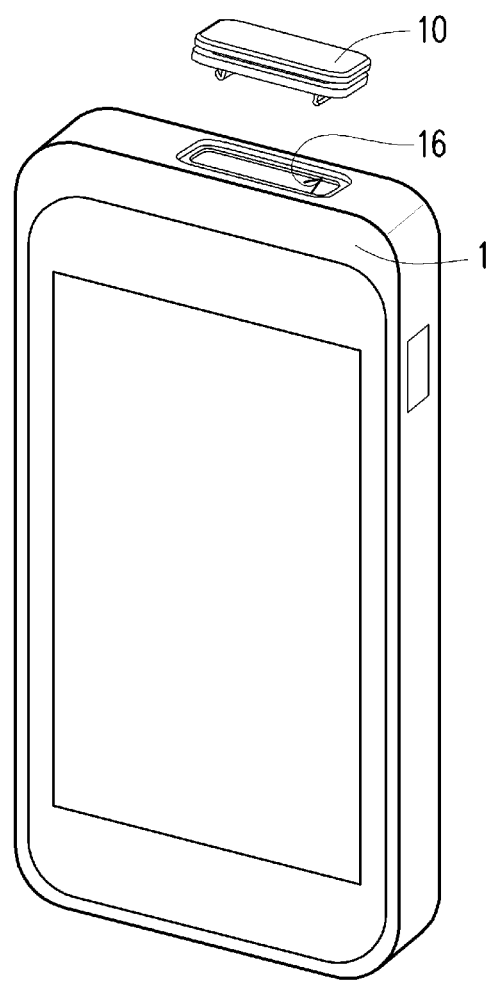
FIG. 1 and FIG. 2 are respectively an explosion diagram and a schematic diagram of a key module assembled to a housing according to an embodiment of the invention.
Figure 2:
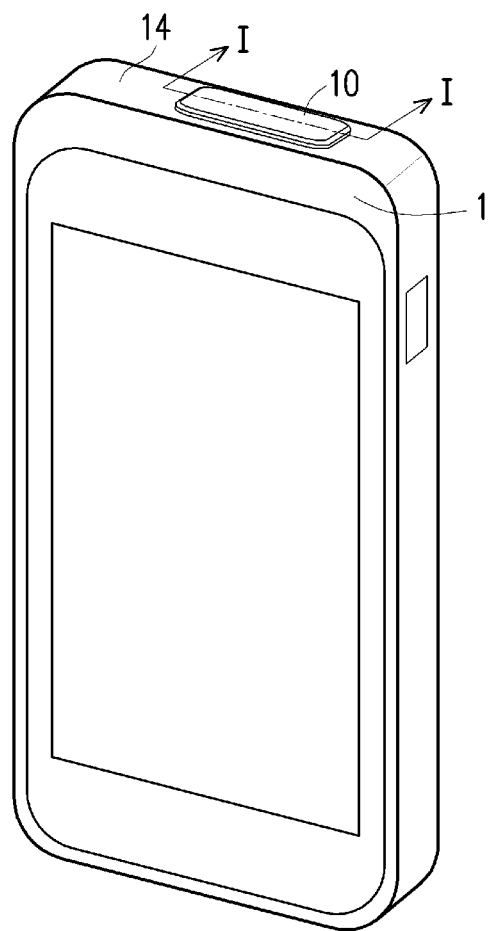
Figure 3:
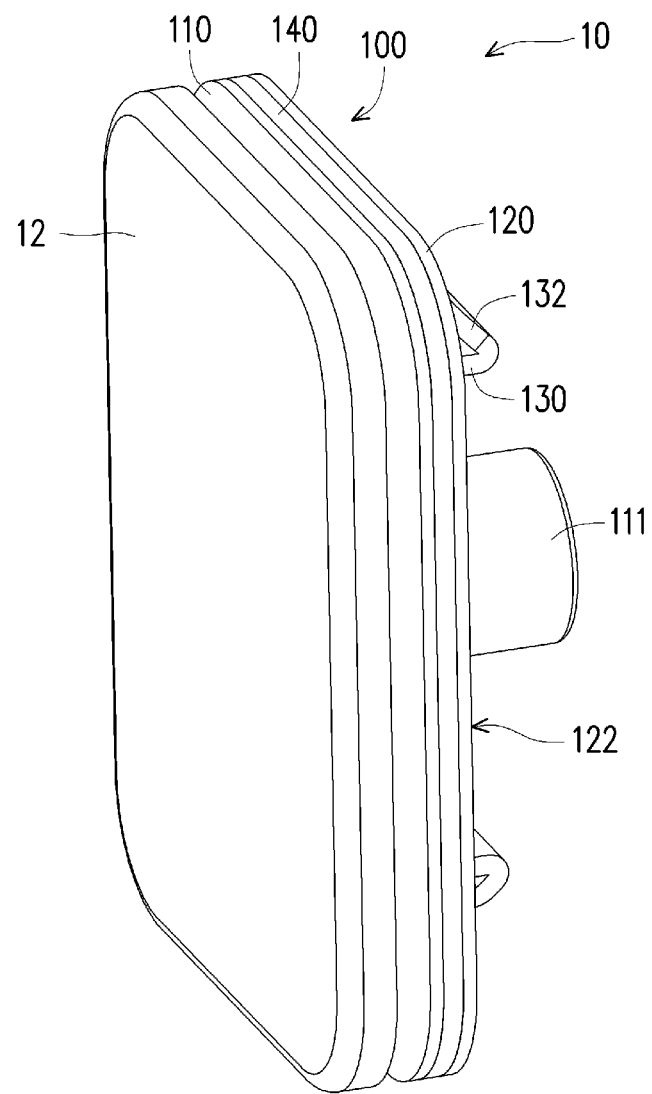
FIG. 3 is a schematic diagram of the key module depicted in FIG. 1.
Figure 4:
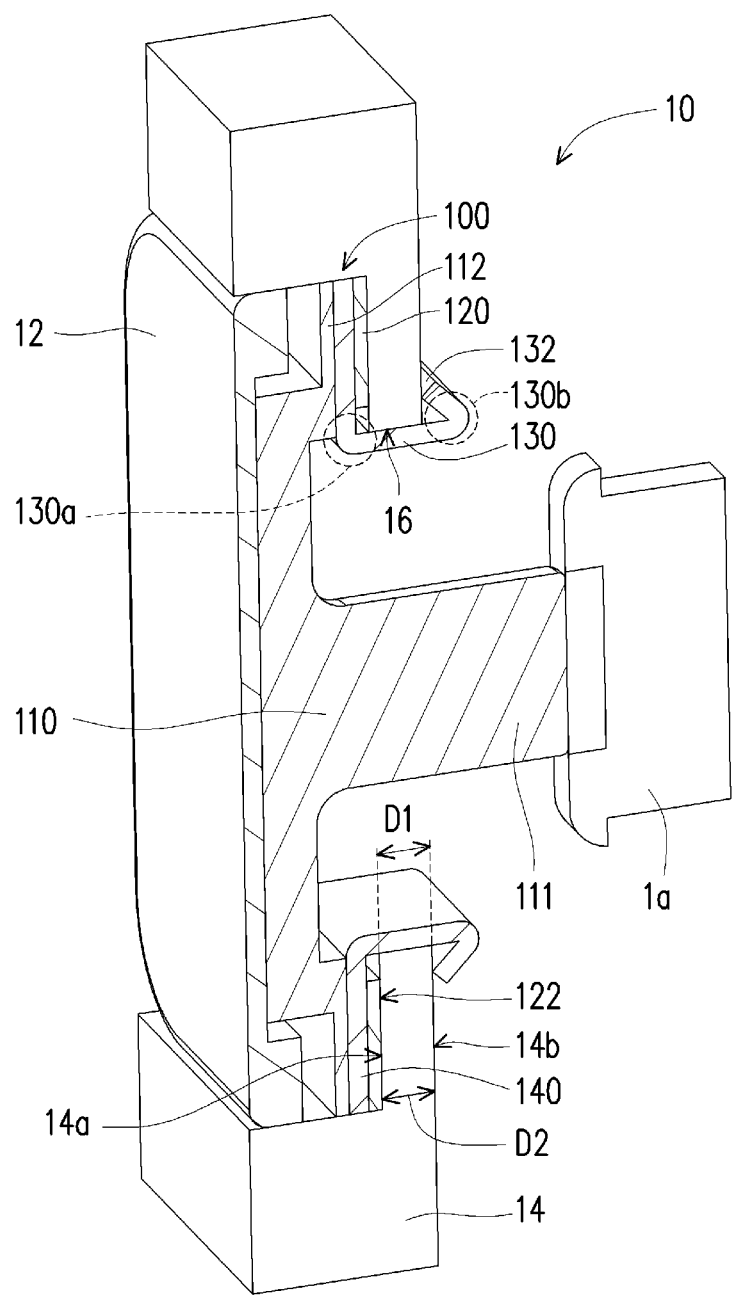
FIG. 4 is a cross-sectional diagram of FIG. 2 along a sectional line I-I.

FIG. 1 and FIG. 2 are respectively an explosion diagram and a schematic diagram of a key module assembled to a housing according to an embodiment of the invention. FIG. 3 is a schematic diagram of the key module depicted in FIG. 1. FIG. 4 is a cross-sectional diagram of FIG. 2 along a sectional line I-I. Referring to FIGS. 1 to 4, a key module 10 of the present embodiment is configured to be assembled to an opening 16 of a housing 14, and the housing 14 has an outer surface 14a and an inner surface 14b oppositely disposed. The key module 10 includes a key cap 12, a main part 110, a sealing part 120 and at least two latch parts 130. The main part 110 is connected to the key cap 12. After the key cap 12 is pressed, the main part 110 is deformed to press an actuator 1a to trigger a signal. The sealing part 120 is disposed between the main part 110 and the outer surface 14a of the housing 14, and surrounding the opening 16 to prevent external foreign bodies from entering the opening 16 through a gap between the main part 110 and the outer surface 14a. Each latch part 130 includes an end 130b with a latch 132 buckled to the inner surface 14b of the housing 14. Each latch part 130 includes another end 130a tightly bonded to the main part 110. Each latch part 130 is leaned against the inner surface 14b of the housing 14 by the latch 132, so that the outer surface 14a of the housing 14 is pressed by the main part 110.

In the present embodiment, the key module 10 is, for example, a key disposed on a hand-held electronic device 1. The hand-held electronic device 1 is, for example, a mobile phone, a notebook computer, a military regulation phone or a military computer, and the key is, for example, a power key. An actuator 1a is further provided inside the hand-held electronic device 1, and an actuating portion 111 is provided accordingly to the main part 110. When the main part 110 is pressed, the main part 110 can be deformed to press the actuator 1a through the actuating portion 111, so as to trigger the signal. However, ways for the main part 110 to trigger the signal are not particularly limited in the invention. In the present embodiment, a clipping structure 100 may be co-constructed with the main part 110, the sealing part 120 and the at least two latch parts 130, so that the key cap 12 of the key module 10 may be limited inside the opening 16 of the housing 14. However, the clipping structure 100 of the present embodiment is not limited to the above-said members. More specifically, in the clipping structure 100, the main part 110 may include a sticking portion 112, and the sealing part 120 is disposed between the sticking portion 112 and the outer surface 14a of the housing 14. Therefore, when the main part 110 of the clipping structure 100 is buckled around the opening 16 so the key cap 12 is limited inside the opening 16 in a plane direction, the sealing part 120 is capable of sealing the gap between the sticking portion 112 and the outer surface 14a. The latch 132 of the latch part 130 is leaned against the inner surface 14b of the housing 14, and the sealing part 120 may be tightly attached to the outer surface 14a of the housing 14 by the another end 130a of the latch part 130 tightly bonding to the main part 110. In the present embodiment, the sealing part 120 may be an encapsulant, and the encapsulant has waterproof and dustproof characteristics, such as a waterproof adhesive. In addition, the sealing part 120 may also be a compressible double-sided adhesive, or a buffer material with a surface coated with a backing adhesive. However, the invention is not limited thereto.

The key module 10 of the present embodiment may be fixed to the housing 14 through the clipping structure 100, and the outer surface 14a and the inner surface 14b of the housing 14 are fixed respectively by the sealing part 120 and the latch 132, such that the external foreign bodies (such as dust or water) cannot pass the gap between the key module 10 and the housing 12. Furthermore, the clipping structure 100 may squeeze the sealing part 120 without disposing additional screws, such that production costs may and a size thereof may both be reduced.

Figure 5:
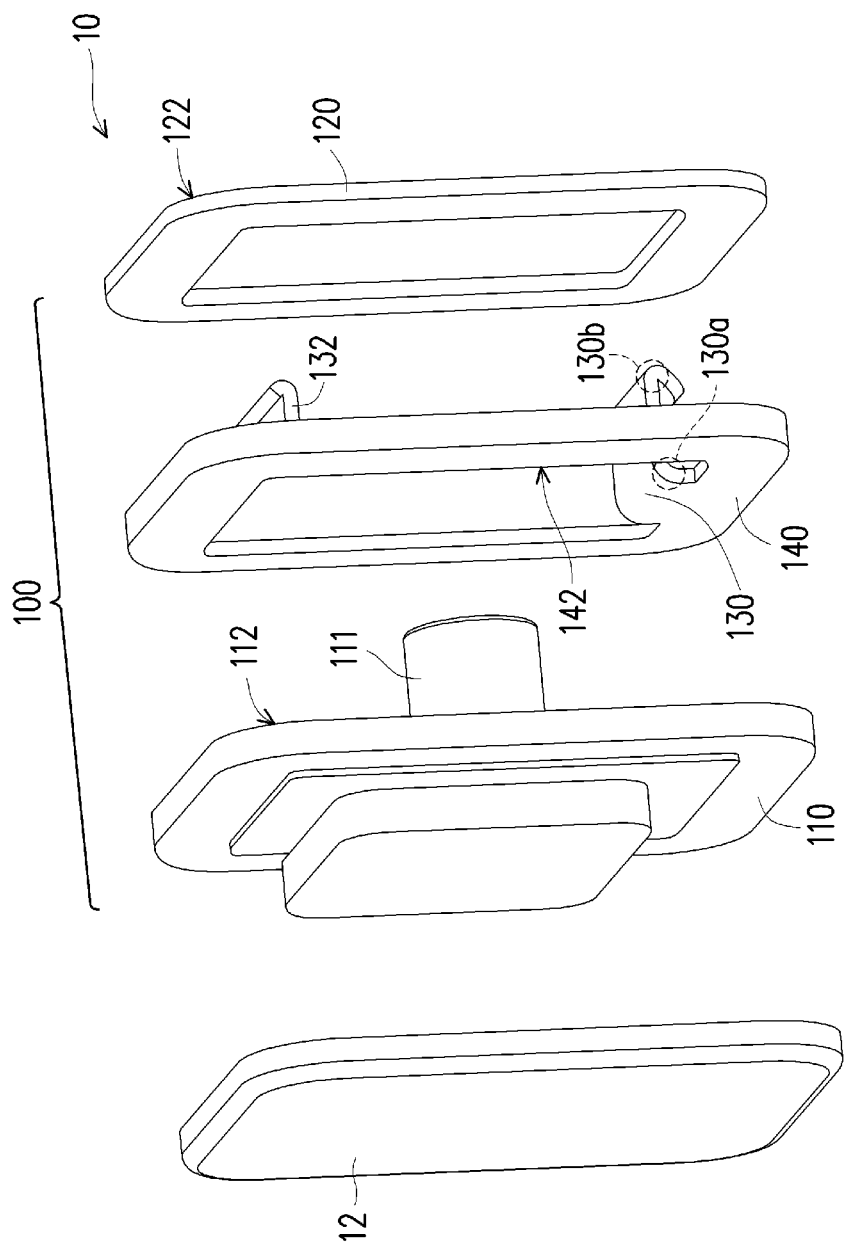
FIG. 5 is an explosion diagram of FIG. 3.

FIG. 5 is an explosion diagram of FIG. 3. Referring to FIGS. 3 to 5, the clipping structure 100 includes at least two latch parts 130 (a number of the latch parts 130 may be two or a multiple of two) oppositely disposed at two opposite sides of the clipping structure 100. By disposing the latch parts 130 to the two opposite sides, a force for the clipping structure 110 to clip the housing 14 may be uniformly applied, so that the same sealing effect may be provided around the key module 10. Furthermore, in the present embodiment, a platen 140 is co-constructed with the another end 130b of the latch part 130 opposite to the latch 132. For instance, in the clipping structure 100 of the present embodiment, the platen 140 is a ring structure, and the sticking portion 112 of the main part 110 is tightly attached to the platen 140. The latch 132 extends from surrounds of an opening 142 of the platen 140. When the latch 132 is buckled to the inner surface 14b, the latch part 130 may move the platen 140 to press the sealing part 120, so as to achieve the sealing effect. In the present embodiment, the platen 140 and the latch part 130 are, for example, a metal material, and the main part 110 is, for example, a rubber, but the invention is not limited thereto.

In the present embodiment, before the key module 10 is assembled to the housing 14, a distance D1 from a top end (i.e., an edge of the inner surface 14b where the latch 132 is leaned against when the key module 10 is assembled to the housing) of the latch 132 of each latch part 130 to a contact surface 122 (i.e., a surface of the outer surface 14a where the sealing part is contacted when the key module 10 is assembled to the housing) of the sealing part 120 is less than or equal to a distance D2 from the outer surface 14a to the inner surface 14b in the housing 14. In other words, before the key module 10 is assembled to the housing 14, an admissible clipping range (i.e., the distance D1) of the latch 132 is less than the distance D2 from the outer surface 14a to the inner surface 14b in the housing 14. Therefore, when the latch 132 of the latch part 130 is buckled to the inner surface 14b, the latch part 130 is capable of clipping the housing 14 while compressing the sealing part 120, so as to avoid the gap from forming between the latch part 130 and the housing 14.

Figure 6:
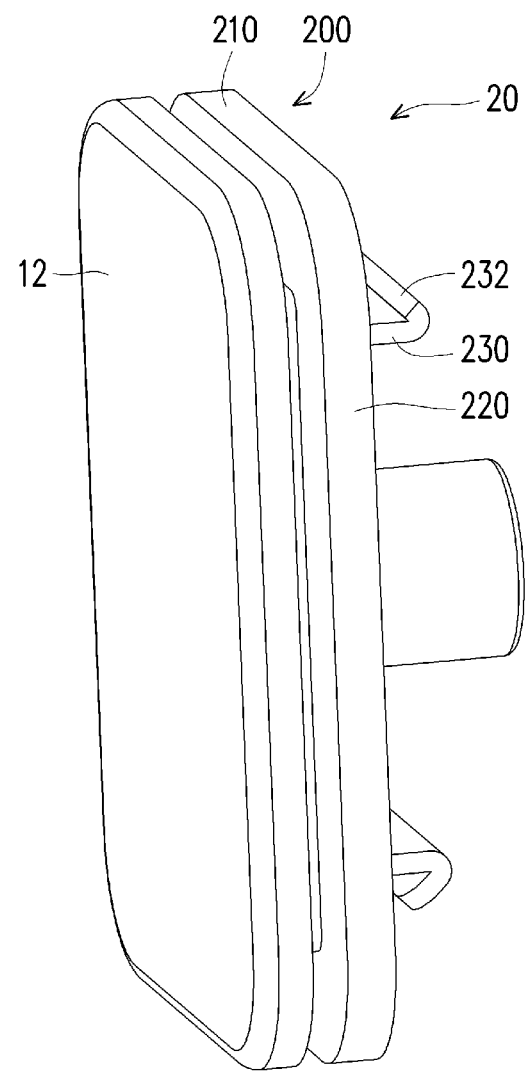
FIG. 6 is a schematic diagram of a key module according to another embodiment of the invention.
Figure 7:
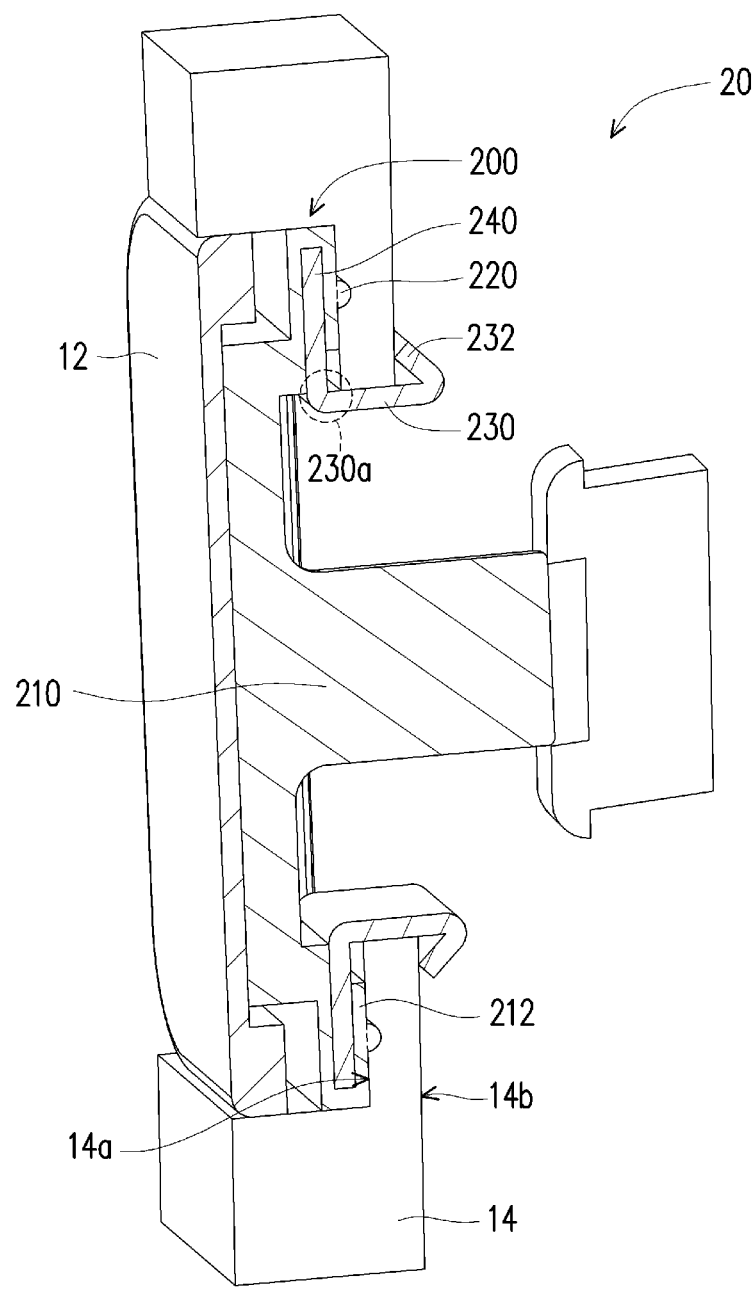
FIG. 7 is a cross-sectional diagram of FIG. 6.
Figure 8:
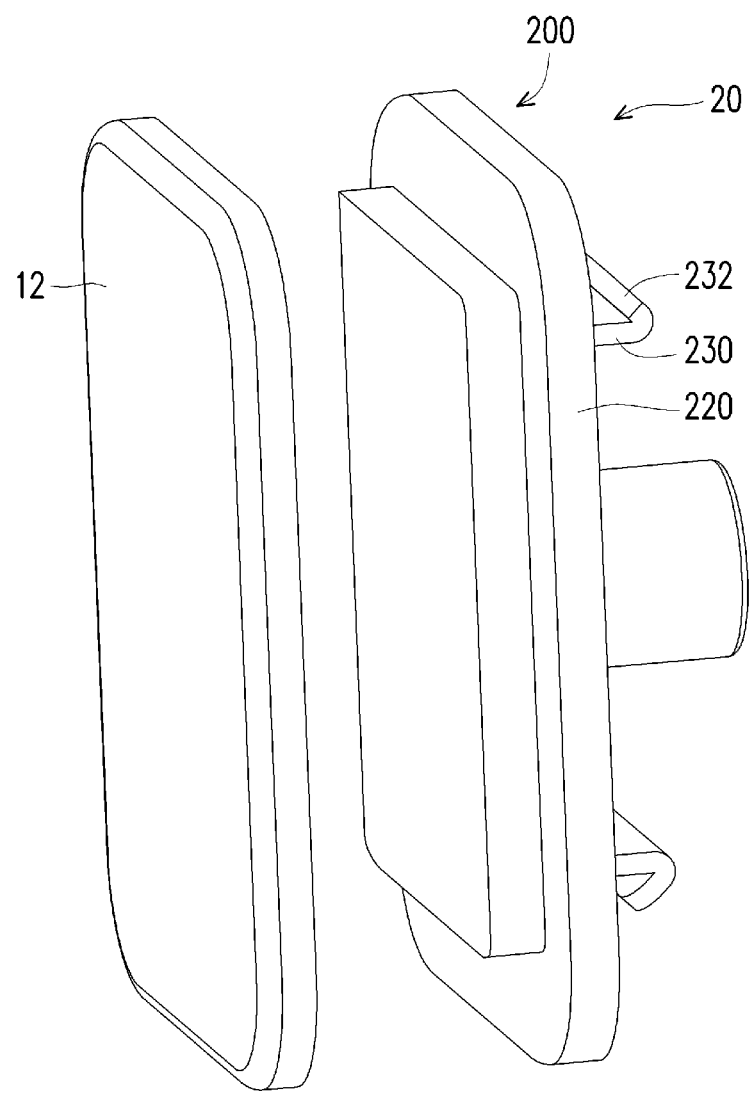
FIG. 8 is an explosion diagram of FIG. 6.

FIG. 6 is a schematic diagram of a key module according to another embodiment of the invention. FIG. 7 is a cross-sectional diagram of FIG. 6. FIG. 8 is an explosion diagram of FIG. 6. Referring to FIGS. 6 to 8, in a key module 20 of the present embodiment, a platen 240 having a ring structure is also co-constructed with an end 230a of a latch part 230 opposite to a latch 232 in a clipping structure 200. However, unlike the embodiment of FIG. 3, a main part 210 is not only attaching to the platen 240 but also covering the platen 240. For instance, the platen 240 may first be disposed in a mold, and then the main part 210 may be formed by utilizing a method of injection molding to cover the platen 240 within the main part 210. A sealing part 220 is a sealing ring being an independent member. The sealing part 220 is, for example, an O-ring disposed on a sticking portion 212 of the main part 210. In addition, in other embodiments of the invention which are not illustrated, the sealing part may also be integrally formed with the main part, such as an annular protrusion. However, the invention is not limited thereto.

In other words, in FIGS. 6 to 8, when the latch 232 is buckled to the inner surface 14b, the latch part 230 may pull the platen 240 to press the sealing part 220, and the platen 240 may also press the sticking portion 212 of the main part 210, so that the sealing ring disposed on the sticking portion 212 may interfere the housing 14 to generate the sealing effect. However, the invention is not limited thereto. In other embodiments of the invention which are not illustrated, the main part may still cover the platen, but the sticking portion and the sealing part may be disposed at an area not overlapping with a projection of the platen. When the latch is buckled to the housing, the gap between the housing and the main part may be sealed by the sealing part, and the main part may also be pressed by the platen, so that the main part may interfere the housing to generate the sealing effect.

In summary, the clipping structure of the invention is capable of fixing the key cap of the key, and the main part of the clipping structure may be attached to the outer surface of the housing by the sealing part. The latch of the latch part is capable of being buckled to the inner surface of the housing, and pressing the sticking portion of the main part to the outer surface of the housing, such that attachment between the outer surface and the sealing part may be improved, so as to prevent water and foreign bodies form entering. In addition, the sealing part may be a waterproof adhesive or a structure of O-ring, and the platen may be co-constructed with the latch part, so that the force for the clipping structure to clip the housing may be uniformly applied. In the clipping structure of the invention, by utilizing the sealing part and the latch to clip the housing, the waterproof effectiveness of the key may be improved, and spaces required for the structure may also be saved.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A clipping structure configured to clip a key cap of a key module to a housing having an outer surface and an inner surface oppositely disposed, and the clipping structure comprising:
    a main part connected to the key cap, and having a sticking portion and an actuating portion;
    a sealing part disposed between the sticking portion of the main part and the outer surface of the housing;
    at least two latch parts, each of the latch parts including an end with a latch buckled to an inner surface of the housing, and another end tightly bonded to the main part, so that the outer surface of the housing is pressed by the sticking portion of the main part; and
    a platen having an opening, wherein the at least two latch parts are connected to the platen, and the actuating portion passes through the opening.

2. The clipping structure of claim 1, wherein the sealing part comprises a waterproof material.

3. The clipping structure of claim 1, wherein the sealing part is a sealing ring.

4. The clipping structure of claim 1, wherein the platen is co-constructed with the another end of each of the at least two latch parts tightly bonded to the main part.

5. The clipping structure of claim 4, wherein the main part further covers the platen.

6. The clipping structure of claim 1, wherein a material of the at least two latch parts is a metal, and a material of the main part is a rubber.

7. A key module configured to be assembled to an opening of a housing having an outer surface and an inner surface oppositely disposed, and the key module comprising:
    a key cap;
    a main part connected to the key cap;
    a sealing part disposed between the main part and the outer surface of the housing, and surrounding the opening to prevent external foreign bodies from entering the opening through a gap between the main part and the outer surface;
    at least two latch parts, each of the latch parts including an end with a latch buckled to an inner surface of the housing, and another end tightly bonded to the main part, so that the outer surface of the housing is pressed by the main part; and
    an actuator, wherein the key cap, main part and actuator are arranged such that when the key cap is pressed, the main part presses the actuator to trigger a signal
    a platen having an opening, wherein the at least two latch parts are connected to the platen, and an actuating portion of the main part passes through the opening to contact the actuator.

8. The key module of claim 7, wherein the sealing part comprises a waterproof material.

9. The key module of claim 7, wherein the sealing part is a sealing ring.

10. The key module of claim 7, wherein the platen is co-constructed with the another end of each of the at least two latch parts tightly bonded to the main part.

11. The key module of claim 10, wherein the main part further covers the platen.

* * * * *